US008271959B2

(12) United States Patent
Krauss (10) Patent No.: US 8,271,959 B2
(45) Date of Patent: Sep. 18, 2012

(54) DETECTING IRREGULAR PERFORMING CODE WITHIN COMPUTER PROGRAMS

(75) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 12/110,326

(22) Filed: Apr. 27, 2008

(65) Prior Publication Data
US 2009/0271769 A1 Oct. 29, 2009

(51) Int. Cl.
G06F 9/44 (2006.01)
(52) U.S. Cl. ...................................................... 717/131
(58) Field of Classification Search .......... 717/126–127, 717/131–133; 700/108
See application file for complete search history.

(56) References Cited

U.S. PATENT DOCUMENTS

| | | | | |
|---|---|---|---|---|
| 4,845,615 A * | 7/1989 | Blasciak | ......................... | 714/10 |
| 5,164,969 A * | 11/1992 | Alley et al. | ..................... | 377/39 |
| 5,797,019 A * | 8/1998 | Levine et al. | ................. | 710/262 |
| 6,002,872 A * | 12/1999 | Alexander, III et al. | ....... | 717/127 |
| 6,126,329 A * | 10/2000 | Bennett et al. | ................. | 717/127 |
| 6,230,114 B1 * | 5/2001 | Hellestrand et al. | ............ | 703/13 |
| 6,557,167 B1 * | 4/2003 | Thelen | ........................... | 717/127 |
| 6,934,942 B1 | 8/2005 | Chilimbi | | |
| 6,983,455 B2 * | 1/2006 | Kuzmin | ........................ | 717/130 |
| 7,269,824 B2 * | 9/2007 | Noy et al. | ...................... | 717/127 |
| 7,434,028 B2 * | 10/2008 | Dwyer et al. | ................. | 712/200 |
| 7,571,478 B2 * | 8/2009 | Munson et al. | .................. | 726/23 |
| 7,770,140 B2 * | 8/2010 | Bell et al. | ...................... | 716/106 |
| 7,945,898 B1 * | 5/2011 | Episkopos et al. | ............ | 717/124 |
| 2005/0278183 A1 | 12/2005 | Ammons | | |
| 2005/0278703 A1 * | 12/2005 | Lo et al. | ......................... | 717/126 |
| 2006/0092846 A1 * | 5/2006 | Loh et al. | ....................... | 370/241 |
| 2006/0130001 A1 * | 6/2006 | Beuch et al. | ................... | 717/130 |
| 2007/0016893 A1 * | 1/2007 | Branda et al. | ................. | 717/127 |
| 2007/0261032 A1 * | 11/2007 | Chen et al. | ..................... | 717/130 |
| 2007/0282928 A1 * | 12/2007 | Jiao et al. | ....................... | 707/204 |
| 2008/0177756 A1 * | 7/2008 | Kosche et al. | ................. | 707/100 |

OTHER PUBLICATIONS

"Profiling over Adaptive Ranges", Mysore et al., In Proceedings of the 4th Annual International Symposium on Code Generation and Optimization (CGO), Mar. 2006.*
"Accurate, Efficient, and Adaptive Calling Context Profiling", Zhuang et al., Copyright c 2006 ACM 1-59593-320-4/06/0006.*
Georges et al., Method-Level Phase Behavior in Java Workloads, Proceedings of the 19th Annual ACM SIGPLAN Conference on Object-Oriented Programming, Systems, Languages, and Applications, Oct. 24-28, 2004, Vancouver British Columbia, Canada.

(Continued)

Primary Examiner — Don Wong
Assistant Examiner — Daxin Wu
(74) Attorney, Agent, or Firm — Cuenot, Forsythe & Kim, LLC (57) ABSTRACT

A computer-implemented method of finding portions of a computer program exhibiting irregular performance can include detecting an entry into a function of a computer program under test indicating a current execution of the function and, responsive to detecting an exit from the function, determining a count of a computing resource utilized by the function during the current execution of the function. The count of the computing resource can be compared with a count range determined according to at least one prior execution of the function. The function can be selectively represented within a call graph as a plurality of nodes according to the comparing.

18 Claims, 5 Drawing Sheets

OTHER PUBLICATIONS

London et al., End-user Tools for Application Performance Analysis Using Hardware Counters. International Conference on Parallel and Distributed Computing Systems, Dallas, TX, Aug. 8-10, 2001.

Brear et al., Search Strategies for Java Bottleneck Location by Dynamic Instrumentation, IEEE Software Proceedings, vol. 150, issue 4, pp. 235-241, Aug. 26, 2003.

Beyls et al., Intermediately Executed Code is the Key to Find Refactorings that Improve Temporal Data Locality, Proceedings of the 3rd Conference on Computing Frontiers (CF'06), Ischia, Italy, pp. 373-382, May 3-5, 2006.

Roth et al., Deep Start: A Hybrid Strategy for Automated Performance Problem Searches, Euro-Par 2002 Parallel Processing, Proceedings of 8th International Euro Par Conference, pp. 86-96, Paderborn, Germany, Aug. 27-30, 2002.

Dmitriev, Profiling Java Applications Using Code Hotswapping and Dynamic Call Graph Revelation, Proceedings of the 4th International Workshop on Software and Performance (WOSP'04), Redwood City, California, pp. 139-150, Jan. 14-16, 2004.

Wong et al., "An Integrated Solution for Testing and Analyzing Java Applications in an Industrial Setting", APSEC '05, Software Engineering Conference, 12th Asia-Pacific (Dec. 15-17, 2005).

* cited by examiner

```
int baz3(int v, int w)
{
  unsigned int big = 0;
  if (v <= w)
  {
    big = (unsigned int) v * (unsigned int) w * 0x10000000;
  }
  while (big > 0)
  {
    big = big - 1;
    v = v - 1;
    w = w - 1;
        if (big < 0x500)
    {
      return v;
    }
    if (v < 0)
    {
      big = big + 2;
      v = v + big / 100;
    }
    else if (w < 0)
    {
      big = big + 2;
      w = baz1(big);
    }
  }
  return w;
} int baz2(int x, int y)
{
  return baz3(x, y);
} int baz1(int m)
{
  int n = 3;
  return baz2(m, n);
} int main(void)
{
  int a = 2;
  return baz1(a);
}
```

| | Function | Calls | Function Time |
|---|---|---|---|
| 900 | baz1 (short) | 805,308,237 | 4,687,865.00 |
| | baz1 (long) | - | - |
| | baz2 (short) | 2,415,925,454 | 16,742,386.77 |
| | baz2 (long) | - | - |
| | baz3 (short) | 805,268,002 | 4,018,170.00 |
| | baz3 (long) | 40,235 | 8,040,200.00 |

FIG. 9

DETECTING IRREGULAR PERFORMING CODE WITHIN COMPUTER PROGRAMS

BACKGROUND

The embodiments of the present invention relate to finding portions of a computer program that exhibit irregular performance. Modem computer programs are composed of functions. Within object oriented programming, functions also are referred to as "methods." These functions are often complex in nature, exhibiting different behaviors under correspondingly different circumstances. This can mean that a function may exhibit varying performance according to the particular circumstances at hand when the computer program, and particularly that function, operates.

Developers have come to analyze computer programs in terms of the performance of individual functions. Performance profiling tools can provide information such as the total amount of time spent within a given function during execution of the computer program under analysis. Profiling tools can provide this information in the form of a call graph, for example.

As noted, because of the changing circumstances in which a function may operate, it may be the case that the function performs well in some situations, while performing poorly in other situations. The relative importance of a function's contribution to overall program performance may also vary according to the frequency of calls to the function during runtime of the computer program. Identifying these conditions with available profiling and analysis tools can be difficult.

BRIEF SUMMARY OF THE INVENTION

The embodiments disclosed herein relate to identifying portions of code of a computer program that perform irregularly from time to time. One embodiment of the present invention can include a computer-implemented method of finding portions of a computer program exhibiting irregular performance. The method can include detecting an entry into a function of a computer program under test indicating a current execution of the function and, responsive to detecting an exit from the function, determining a count of a computing resource utilized by the function during the current execution of the function. The count of the computing resource can be compared with a count range determined according to at least one prior execution of the function. The function can be selectively represented within a call graph as a plurality of nodes according to the comparison of the count of the computing resource with a count range determined according to at least one prior execution of the function.

Another embodiment of the present invention can include a computer-implemented method of finding portions of a computer program exhibiting irregular performance. The method can include determining a count indicating usage of a computing resource during invocation of a function and identifying a stack frame corresponding to the function. The stack frame can include at least one count element. Each count element can represent at least one execution of the function that utilized an amount of the computing resource within a range corresponding to the count element.

The method further can include comparing the count with the count range of each count element. When the count is within the count range of a selected count element, the count can be aggregated within the selected count element. When the count does not fall within any count range of the at least one count element, a new count element can be created and the count can be added to the new count element. A call graph can be output. The call graph can represent an execution of the computer program and include within the call graph a number of nodes, each representing the function. The number of nodes can depend upon a number of the count elements within the stack frame corresponding to the function.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, electromagnetic, magneto-optical, infrared, or semiconductor system, apparatus, device, or propagation medium. More specific examples (a non-exhaustive list) of the computer-readable medium(s) would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, transmission media such as those supporting the Internet or an intranet, or a magnetic storage device.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowcharts and/or block diagram block or blocks.

The embodiments disclosed herein relate to identifying portions of code of a computer program that exhibit irregular or varying performance. More particularly, the embodiments of the present invention can identify those functions that exhibit irregular performance in some instances. As noted, functions may also be referred to as "methods" in the context of object oriented programming. Accordingly, the term "function" is used within this specification to refer a function and/or a method.

As a computer program under test (CPUT) executes, the execution of functions of the CPUT can be identified and monitored. Execution information relating to the performance of the functions of the CPUT, during different invocations of those functions, can be retained and presented in any of a variety of formats including an enhanced call graph. The execution information that is collected and the call graph that is displayed from that information can indicate those instances in which a function performed in a manner considered non-conforming with respect to one or more prior executions of the function.

Conventional analysis tools typically display a call graph that illustrates the functions called during runtime of an instrumented CPUT. The call graph can convey information such as the total amount of time spent within a given function during execution of the instrumented CPUT. The call graph represents each function that executes during runtime as a single node. Such is the case despite the number of times that each function may have executed or the range of behaviors exhibited by the function during each execution. In accordance with the embodiments disclosed herein, the system can represent a single function using a plurality of different nodes in a call graph based upon the amount of a computing resource consumed during each respective execution of the function.

Figure 1:
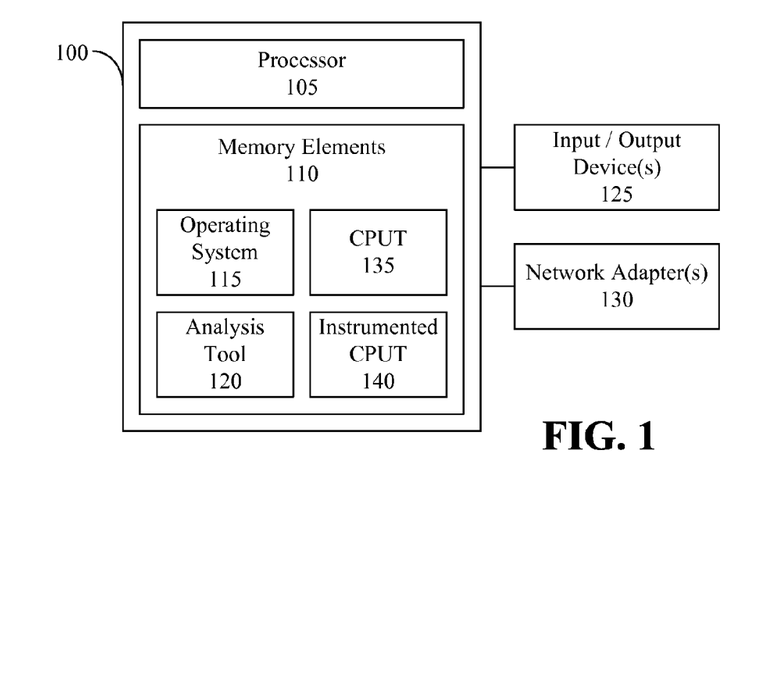
FIG. 1 is a first block diagram illustrating a data processing system in accordance with one embodiment of the present invention.

FIG. 1 is a first block diagram illustrating a data processing system 100 in accordance with one embodiment of the present invention. The data processing system 100 can be suitable for storing and/or executing program code and can include at least one processor 105 coupled directly or indirectly to memory elements 110 through a system bus (not shown). The memory elements 110 can include local memory employed during actual execution of the program code. The memory elements 110 also can include bulk storage and cache memories. Accordingly, the memory elements can include system memory in which an operating system 115 and an analysis tool 120 can be stored. The processor 105 can execute the analysis tool 120, in cooperation with the operating system 115, to perform the various processing functions described herein.

Input/output (I/O) devices 125 such as, for example, keyboards, displays, pointing devices, microphones, speakers, disk storage devices, tape storage devices, other memory devices, etc., can be coupled to the data processing system 100 either directly or through intervening I/O controllers (not shown). Network adapter(s) 130 may also be coupled to the data processing system 100 to enable the data processing system 100 to become coupled to other data processing systems or remote printers or storage devices through intervening private or public networks. Modems, cable modems, and Ethernet cards are just a few of the currently available types of network adapters 130.

In operation, a CPUT 135 can be loaded into the data processing system 100 and stored within memory elements 110. The processor 105, executing the analysis tool 120, can instrument the CPUT 135 to generate and store the instrumented CPUT 140. The term "instrumenting" or "instrument" refers to adding diagnostic code to an existing computer program, e.g., CPUT 135. The analysis tool 120 can insert diagnostic code into the CPUT 135 in any of a variety of different ways including, for example, inserting diagnostic code into the source code of the CPUT 135 which would require compilation, inserting diagnostic code into the object code of the CPUT 135, e.g., after compilation, or the like. The diagnostic code in the instrumented CPUT 140 will include analysis code that can detect events that occur within the executing and instrumented CPUT 140 such as entries into functions, exits from functions, and logging and/or monitoring of computing resources utilized by each function during individual invocations of such functions. The logging and/or monitoring of computing resources that is part of the diagnostic code in the instrumented CPUT 140 can include counting of instruction and basic block clock cycles, interception of memory allocations, deallocations, and reallocations, sampling of instruction pointers or other thread execution context values, and other profiling and general runtime analysis techniques.

The data processing system 100 can execute the instrumented CPUT 140. The diagnostic code within the instrumented CPUT 140 can collect information relating to the execution of each function or only selected functions. The collected information can be referred to as execution data or profiling data. The diagnostic code of the CPUT 140 and/or the analysis tool 120 can evaluate the collected execution data on a per function call basis. Accordingly, the analysis tool 120 can store and/or present the execution data during execution of the instrumented CPUT 140 or upon completion of execution of the instrumented CPUT 140.

Typically execution data for a function of the CPUT 140 is collected and presented in the aggregate. That is, the execution data collected from each execution of a selected function is aggregated with execution data from prior executions of the function. Conventional analysis tools do not evaluate each execution of a function so as to be able to identify particular function executions that exhibit abnormal or varying execution behavior. In other words, providing aggregated execution data reflecting all executions of a function during operation of the instrumented CPUT does not indicate that, in some cases, the function performed well, while in other cases the function performed poorly. Instead, one may only look to averages, e.g., the total runtime of the function required "X" cycles for "Y" executions or calls.

In accordance with the embodiments disclosed herein, the analysis tool 120 can instrument the CPUT 135 with diagnostic code that allows function performance to be tracked and represented with a higher degree of detail than with conventional profiling tools. The collected execution data can be used to indicate different categories of performance of different functions of the CPUT 140, thereby facilitating the identification of functions that exhibit abnormal or varying behavior from time to time.

Within this specification, terminology such as "function execution," "execution of a function," "function call," "call of a function," "function invocation," and the like are used from time to time interchangeably. These phrases are intended to refer to a particular invocation or call of a particular function. For example, a function may be called ten times during the runtime of a CPUT. This can be expressed as ten function executions or ten function calls. Accordingly, a given execution of the instrumented CPUT 140 may include zero, one, or more executions or calls to each function of the instrumented CPUT 140.

Figure 2:
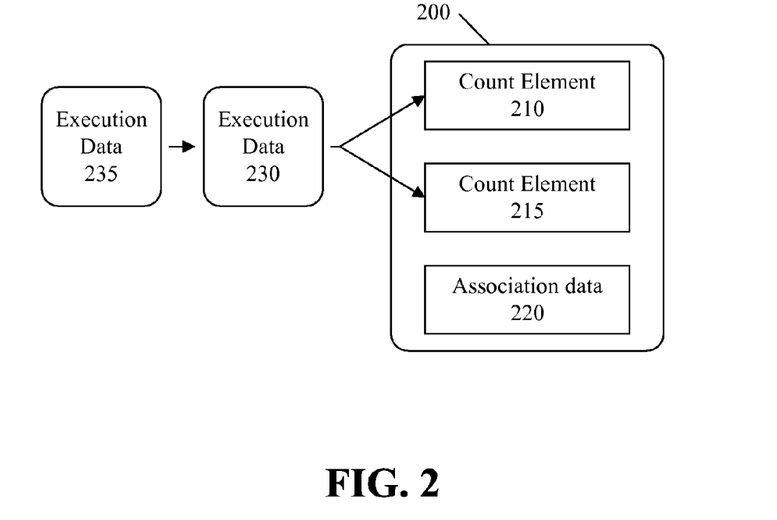
FIG. 2 is a second block diagram illustrating a technique for tracking execution data of functions of a computer program under test (CPUT) in accordance with another embodiment of the present invention.

FIG. 2 is a second block diagram illustrating a technique for tracking execution data of functions of a CPUT in accordance with another embodiment of the present invention. Throughout this specification, the various processing tasks performed by the embodiments of the invention will be described in terms of a "system" performing those tasks, in reference to the data processing system executing the instrumented CPUT (hereafter "CPUT"), or the analysis tool, or some combination of both in a cooperative manner.

FIG. 2 illustrates a stack frame 200 which can be used to store execution data for a function of the CPUT. A "stack frame," as used herein, can refer to an object or data structure within which execution data for a particular function can be stored, persisted, updated, and later recalled. Each stack frame can correspond to a particular function of the CPUT. Each stack frame further can include, or store, execution data from one or more executions of the function.

The phrase "execution data," as used herein can include, but is not limited to, state information for a selected function including local variables, parameter values passed to the function, a return address to the calling function, or any other data that may be found within a call stack of the executing CPUT that is related to the function detected in step 210. Execution data also can include one or more counts, where each count specifies an amount of a particular computing resource used by the function during one or more executions. Examples of computing resources that may be tracked with respect to function execution can include, but are not limited to, the amount of time needed for a function to complete one execution, the amount of memory allocated to the function for one execution, or the like.

For purposes of illustration, stack frame 200 can correspond to a function of the CPUT called "function A." As such, stack frame 200 can include data indicating the association with function A, e.g., association data 220. Stack frame 200 can store execution data from one or more of each invocation or execution of function A during execution of the CPUT. Thus, one stack frame can be created for each function of the CPUT that is invoked, or at least tracked, in consequence of the added diagnostic code.

Stack frame 200 can include a plurality of count elements 210 and 215. Each count element 210 and 215 can be a data structure or object that can store execution data for one or more executions of function A. It should be appreciated that while the stack frame 200 can be said to "include" count elements 210 and 215, such elements can be "associated" with the stack frame 200. Count elements 210 and 215 also can be said to be "of" stack frame 200. In this regard, the terms "include," "associated," and the phrase "of stack frame" are used interchangeably within this specification. The particular execution data stored in each of count elements 210 and 215 will depend upon the amount of the computing resource(s) consumed during each respective execution of function A, as well as metrics associated with each count element 210 and 215 for interpreting execution data. In one embodiment, the count elements 210 and 215 can be part of another sequentially referenced data structure such as, for example, a list, a tree, an array, or the like. The particular manner in which the count elements 210 and 215 are implemented or the particular data structure within which such count elements may be disposed is not intended to limit the embodiments of the present invention.

When a call graph is generated from the data collected during execution of the CPUT, the number of nodes in the call graph that are displayed to represent a particular function will depend upon the number of count elements in the stack frame representing that function. That is, a function can be represented by more than one displayed call graph node in order to indicate, for example, those instances where the function executed and consumed more than a "typical" amount of a selected computing resource. The computing resource, or resources, to be tracked can be selected prior to execution of the CPUT. Metrics also can be defined prior to execution of the CPUT that will control the number of count elements in the stack frame. That is, the metrics define a range or ranges for what is considered normal behavior in view of prior execution(s) of a function. It should be appreciated that while default values can be used, a user also may specify any desired metrics for interpreting execution data.

In illustration, each time function A is invoked, execution data is generated for that invocation and collected. For example, execution data 230 can be collected from invocation number "N" of function A. Execution data 235 can be collected from invocation number "N+1" of function A. Execution data 230 and execution data 235 each can include a count specifying an amount of a selected computing resource used during the N and N+1 invocations of function A respectively. For example, prior to execution of the CPUT, a computing resource to be tracked, e.g., time needed for a function to execute, can be selected. The metrics can be defined for determining which executions consume an amount of time or other resource that is sufficiently distinct from other executions to warrant a separate node in the displayed call graph.

The system can evaluate the count within execution data 230, which specifies execution time for invocation "N," and select a particular count element 210 or 215 within which to store the execution data 230 according to the defined metrics. Similarly, the system can evaluate the count within execution data 235 and select a particular count element 210 or 215 within which to store the execution data 235 according to the metrics.

In one embodiment, the metrics can specify a multiplication factor beyond which multiple call graph nodes can be used to represent the function's performance range. In this sense, the metrics can specify a range of computing resource usage for each count element 210 and 215. If execution data 230, for example, specifies a resource usage that is within the range specified for count element 210, the system can store execution data 230 within count element 210. If execution data 230 specifies a computing resource usage that is within the range specified for count element 215, execution data 230 can be stored within count element 215. Execution data 235 can be processed in the same manner.

It should be appreciated that as the CPUT executes, count elements can be dynamically created and added as may be required when execution data for an invocation of function A does not conform with existing count elements 210 or 215. In this regard, the stack frame 200 may have a single count element, two count elements, or more count elements. In effect, the metrics define the ranges that will be used to select count elements for storing execution data and to control the number of elements that will exist, e.g., be created, for a given stack frame. In this manner, the metrics can control the number of nodes used to represent a function within a call graph.

When execution data is stored within a count element of a given stack frame, the execution data can be aggregated with execution data already within the count element. In this manner, the count from the execution data 230, for example, may be aggregated with an average count that exists within the count element 210, for example. Storing and aggregating execution data within the different count elements allows execution data from each count element to be represented as a distinct node within a call graph. Accordingly, rather than representing function A as a single node within a call graph, function A can be represented by a number of nodes that is equivalent to the number of count elements in stack frame 200, in this case two.

Each count element 210 and 215 can specify location information for the call graph. More particularly, each count element can specify information that indicates the position of the function as displayed within the call graph, with respect to parent, sibling, and descendent functions that also may be displayed within the call graph. For example, each count element can indicate which function called function A and the function to which function A passed control upon exit for the invocations of function A represented by each respective count element. Thus, each count element can specify any incoming and outgoing branches for the node (count element) within the call graph. Typically, this can be specified as pointers to other stack frames and/or count elements within such other stack frames. Such positioning information also can be considered execution data.

Stack frame 200 also can include association data 220. Association data 220 can specify the particular function to which the stack frame 200 is associated. In addition, the association data 220 can specify any temporary buffers that may exist that are related to the stack frame 200, and thus, function A in this case. As will be described herein in greater detail, temporary buffers may be created and used to store execution data for a function until such time that the system selects a count element of a stack frame in which to store the execution data. For example, the system may store execution data for a function that is still executing within a temporary buffer until such time that the function exits and the total amount of the computing resource used during that execution can be ascertained. At that time, the system can select a count element within which to store the execution data. In the example of FIG. 2, association data 220 will specify any temporary buffers that may exist for invocations of function A that are still executing, but for which the execution data has not yet been stored or persisted to stack frame 200.

FIG. 2 is presented to illustrate one technique for tracking computing resource usage by functions of the CPUT. As such, FIG. 2 is not intended to limit the present invention. It should be appreciated that other data structures beyond the stack frame implementation disclosed herein can be used and that the embodiments disclosed herein are not intended to be limited to one particular manner of tracking computing resource usage.

Figure 3:
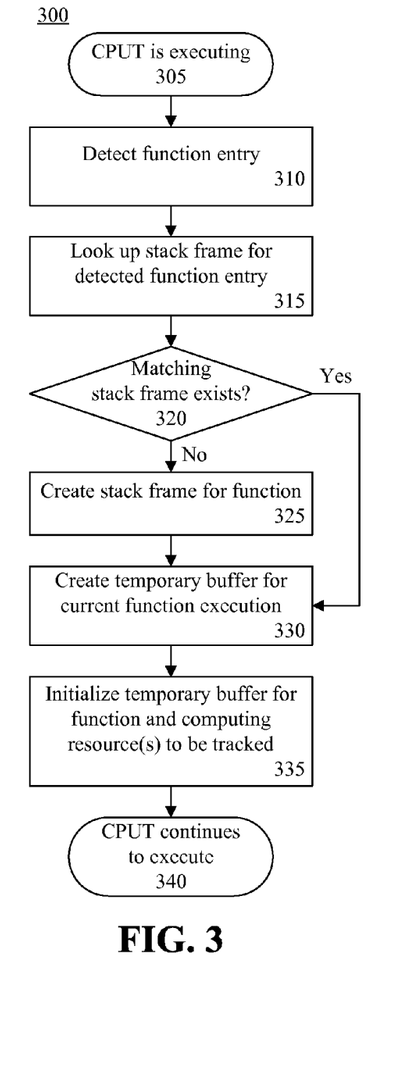
FIG. 3 is a first flow chart illustrating a method of identifying portions of a computer program that exhibit irregular performance in accordance with another embodiment of the present invention.

FIG. 3 is a first flow chart illustrating a method 300 of identifying portions of a computer program that exhibit irregular performance in accordance with another embodiment of the present invention. More particularly, the method 300 illustrates one aspect of creating a call graph for a CPUT. The method 300 can be implemented by a data processing system configured as described with reference to FIGS. 1 and 2. Method 300 can be called or invoked responsive to detecting a function call from the CPUT.

The method 300 can begin in step 305, where the CPUT can be executing. In step 310, the system can determine that a function entry has been detected. A function entry can be an indicator of a current execution of, or call to, the function for which entry is detected. More particularly, the system can detect a call to a function of the CPUT for which diagnostic code was inserted during instrumentation.

In step 315, the system can perform a lookup operation for a stack frame corresponding to the function detected in step 310. In step 320, responsive to the lookup operation of step 315, the system can determine whether a stack frame matching the detected function exists. If so, the method can continue to step 330. If not, the method can proceed to step 325.

The existence of a stack frame for a function indicates that the function detected in step 310 was previously called at least one time during the current execution of the CPUT.

In step 325, in the case where no stack frame exists that corresponds to the function detected in step 310, the system can create a stack frame for the detected function. Continuing with step 330, the system can create a temporary buffer. The system can associate the temporary buffer with the function whose entry was detected in step 310 and also with the stack frame corresponding to the entered function. The temporary buffer can serve as a holding place for execution data including performance count data collected for a current execution of the entered function while the entered function executes. The system can accumulate count data within the temporary buffer until a decision is made as to which count element of the stack frame will be selected to store the count data accumulated for the current invocation of the entered function. As execution continues through various functions, thread local storage can be used to reference the set of active temporary buffers on a per-thread basis, so that different threads simultaneously executing the same function can accumulate separate counts for each function as it executes.

In step 335, the system can initialize the temporary buffer. For example, any execution data, as described herein, for the function that is ascertainable, e.g., available on the call stack, can be stored within the temporary buffer. As part of the temporary buffer, one or more counts that track usage of one or more computing resources also can be initialized. For example, if allocated memory is to be tracked and profiled, a count for the memory allocation can be initialized or reset in step 335. If execution time is the computing resource to be tracked, a clock cycle counter associated with the temporary buffer, or within the temporary buffer, can be initialized. In other examples, a sample counter associated with the temporary buffer can be initialized or a timer can be started. If a clock cycle counter is initialized, then while the function executes, the execution of each basic block of instructions can be detected, and the associated cycle counts can be accumulated in the temporary buffer. If a sample counter is initialized, then while the function executes, a determination can be made at predetermined intervals as to whether execution has continued into a descendent function. If not, the counter associated with the temporary buffer can be incremented. If a timer is started, then when the function exits, the system can determine the execution time of the function by reading the value of the timer. In step 340, the CPUT can continue to execute.

Figure 4:
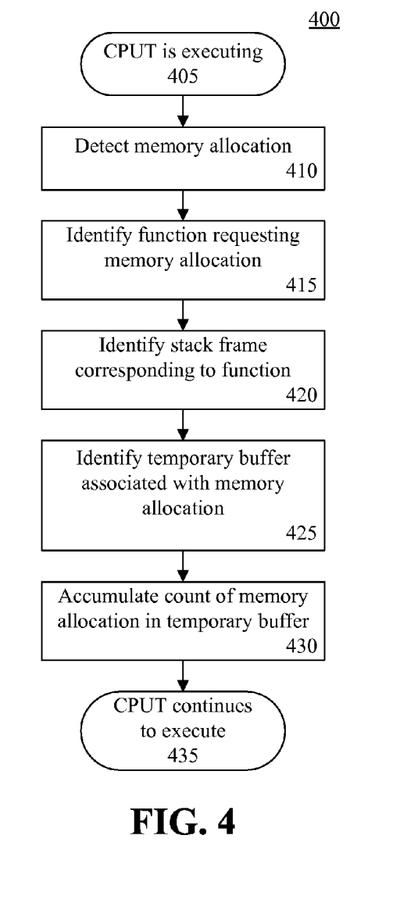
FIG. 4 is a second flow chart illustrating a method of identifying portions of a computer program that exhibit irregular performance in accordance with another embodiment of the present invention.

FIG. 4 is a second flow chart illustrating a method 400 of identifying portions of a computer program that exhibit irregular performance in accordance with another embodiment of the present invention. More particularly, FIG. 4 illustrates a method 400 of tracking usage of computing resources by a function of a CPUT when the computing resource is selected to be memory usage or allocation. The method 400 can be performed by a system as described herein. For example, the method 400 can be performed responsive to a memory allocation request by the CPUT.

Accordingly, the method 400 can begin in step 405 with the CPUT executing. In step 410, the system can determine that a memory allocation has been requested by the CPUT. The CPUT can request that memory be allocated from the operating system through the use of one or more predefined function calls such as, for example, "malloc" within a C or C++ program. Those skilled in the art will appreciate that the particular type of function call that may be detected to indicate an allocation of memory to the CPUT will vary according to the particular operating system within which the CPUT executes, but in any case will be a predetermined function that may be detected through instrumentation of a computer program.

Continuing with step 415, responsive to detecting a memory allocation, the system can identify the function of the CPUT that successfully requested allocated memory. In step 420, the system can identify the stack frame corresponding to the function identified in step 415. In step 425, from the stack frame, the system can identify the temporary buffer within which the count, e.g., indicating the amount, of the allocated memory should be accumulated. The temporary buffer will be the temporary buffer that corresponds to the function that requested the allocated memory.

In step 430, the system can aggregate the amount of memory allocated for the current allocation with the existing count for memory allocation within the temporary buffer. More particularly, when memory is allocated, the new count of, for example, bytes, can be added to the existing amount of memory allocated for the current execution of the function by adding the new count to the existing count within the temporary buffer. The count in the temporary buffer can thus indicate the total amount of allocated memory that has been successfully requested by the function during the current execution of the function. In step 435, the CPUT can continue to execute.

It should be appreciated by those skilled in the art that a realistic depiction of memory usage also requires tracking of deallocated and reallocated memory, on a per-function basis. Tracking of deallocated and reallocated memory can be implemented via methods similar to that described with reference to FIG. 4. For example, as a deallocation of memory from a function occurs, the count in the temporary buffer associated with that function can be reduced by the appropriate amount, e.g., the amount of the memory that was deallocated, as memory is released by the function. Similarly, when memory is reallocated with respect to a particular function, the count of the temporary buffer associated with that function can be adjusted according to the reallocation operation. For the sake of brevity, these steps are not shown but would be similar to those illustrated with respect to FIG. 4, e.g., detect deallocation or reallocation, identify appropriate stack frame and temporary buffer, and decrement appropriate count.

Figures 5, 6:
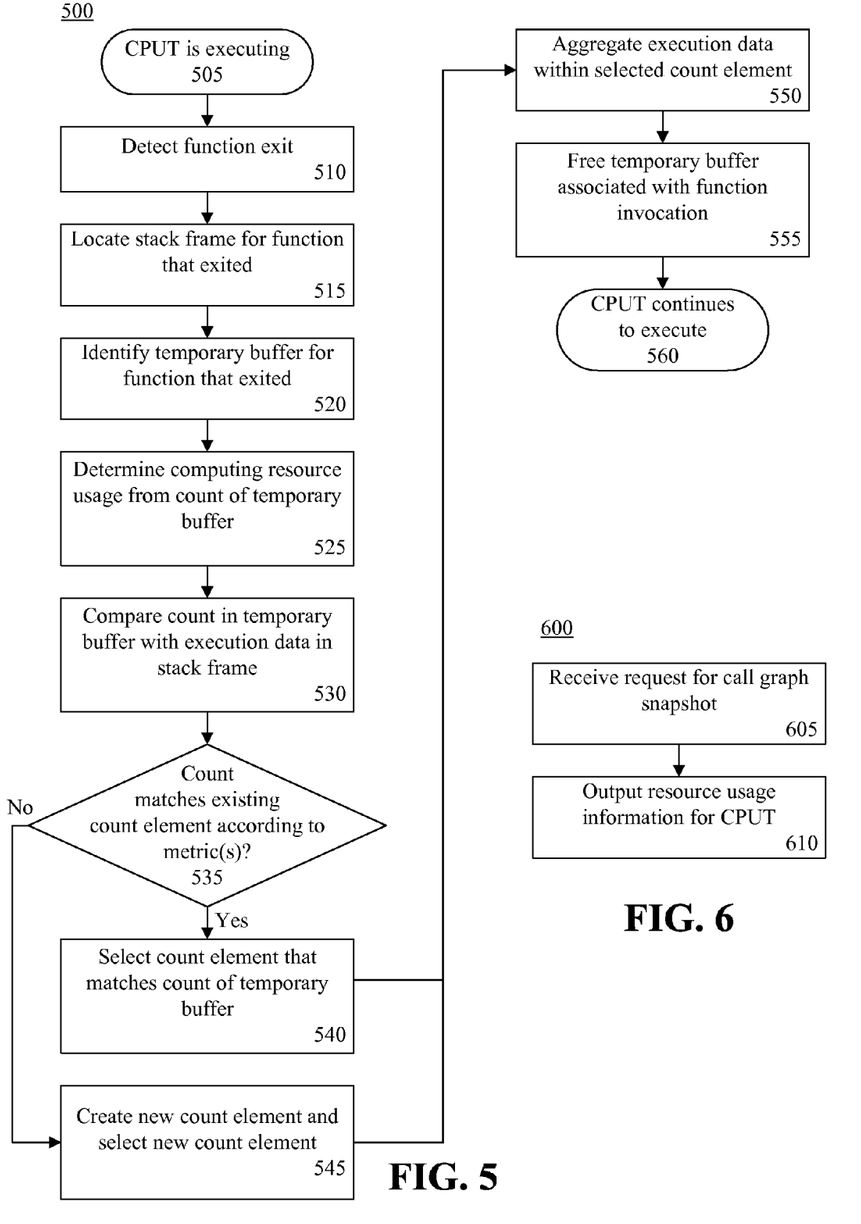
FIG. 5 is a third flow chart illustrating a method of identifying portions of a computer program that exhibit irregular performance in accordance with another embodiment of the present invention.
FIG. 6 is a fourth flow chart illustrating a method of identifying portions of a computer program that exhibit irregular performance in accordance with another embodiment of the present invention.

FIG. 5 is a third flow chart illustrating a method 500 of identifying portions of a computer program that exhibit irregular performance in accordance with another embodiment of the present invention. The method 500 can be performed using a system as described herein, for example, responsive to a function of the CPUT exiting. The method 500 can begin in step 505 where the CPUT is executing. In step 510, the system can determine that a function exit has occurred. For example, the system can detect, or determine, when a currently executing function encounters a return, which passes control to the function that called the now exiting function.

In step 515, the stack frame associated with the function that exited can be located or identified. In step 520, the temporary buffer associated with the function that exited can be identified from the stack frame. In step 525, the amount of computing resource that was utilized by the exiting function can be determined from the count of the temporary buffer.

If, for example, execution time has been selected as the computing resource to be tracked and profiled, the time for execution of the exiting function can be determined from the count of the temporary buffer. In one embodiment, when the function exits, the execution time will have been stored within an appropriate count of the temporary buffer that has been reserved for execution time of the function. As noted, if a timer is used, the value of the timer can be determined upon exit of the function. Alternatively, a timer started at function entry time can now be stopped and read. If the start time of the function was stored in the temporary buffer, the exit time of the function can be stored and compared with the start time of the function to calculate the amount of time that the function required for execution.

If memory usage has been selected as the computing resource to be tracked and profiled, and if the method described in FIG. 4 has been used, the accumulated count of bytes allocated during the most recent execution of the function can be read from the temporary buffer.

In step 530, the system can compare the count stored in the temporary buffer with the execution data in the stack frame. In one embodiment, the count of the temporary buffer can be compared with any average count specified within the individual count elements associated with the stack frame associated with the function. For example, each count element can maintain an average count. The average count of a count element can be an average of the amount of the selected computing resource used during each completed execution of the function that is within the range associated with that count element. In another embodiment, the count of the temporary buffer can be compared with any range or ranges defined for individual count elements according to the metrics applicable to each respective count element.

In illustration, consider the case where the stack frame has two count elements, each including a count reflecting average execution time. The average count within the first count element can be 400,000 μs. The average count of the second count element can be 800,000 μs. The metric for selecting the count element within which execution data from the temporary buffer will be aggregated may specify that if the count of the temporary buffer is within some factor, e.g., 2, of an average count of a count element, e.g., is less than two times the average count of the count element, then select that count element. Thus, at function exit, if the count accumulated in the temporary buffer is 450,000 μs, the execution data from the temporary buffer will be aggregated into the first count element. As data is aggregated, the average count of the count element will be recalculated and, thus, may vary during execution of the CPUT.

If the count of the temporary buffer is 1,200,000 μs, the execution data will be aggregated into the second count element. If the count of the temporary buffer is 2,000,000 μs, the count is more than two times greater than the average count of the second count element. Accordingly, the system can create a new count element and add the new count element to the stack frame. The system can add the execution data to the newly created count element.

It should be appreciated that other techniques or metrics for specifying ranges for count elements can be used. For example, a range can be specified in terms of being within some percent above and/or below the average count of the count element or within some predetermined number above and/or below the average count of the count element. In another example, the metrics can specify ranges that are fixed as opposed to dynamically changing with the average of each count element. For example, a first count element may have a range of 0 μs up to and including 400,000 μs, a second count element may have a range from 400,001 μs up to and including 800,000 μs, and so on.

In step 535, the system can determine whether the count of the temporary buffer is within a count range for one of the count elements of the stack frame. If so, the method can proceed to step 540, where the system can select the count element having a range within which the count falls. If not, the method can proceed to step 545, where the system can create a new count element within the stack frame. The system then can select the newly created count element.

In step 550, the execution data specified within the temporary buffer, including the count, can be aggregated within the selected count element. The execution data stored within the selected count element can include total and average counts associated with the stack frame. Aggregation of the total count may be accomplished using any of the techniques described herein, but is not limited to such techniques.

In the case where the selected count element already includes execution data from one or more prior executions of the function, the system can merge the count from the temporary buffer with the average count in the selected count element. In order to update the average count of a count element with new count data, and not overweight the significance of the new count data, the number of executions upon which the average count was calculated also must be stored and updated within each count element as execution data. In the example to follow, the number of executions upon which the average count of the count element is computed can be the same as the number of updates to the count element.

Consider the case where the average count (AC) within a selected count element indicates a time of 1,000 μs. The number of executions (E) upon which the average count was calculated can be five. If the count from the temporary buffer (TC) is 1,200 μs, the new count can be aggregated with the average count by calculating a new average count that takes into consideration the count from the temporary buffer. Rather than averaging the two together, which would place too much importance upon the count in the temporary buffer, the average count can be recalculated by multiplying the average count by five, adding the count from the temporary buffer, and then dividing by the number of executions upon which the average count was calculated plus one. In other words, the average count ($AC_{New}$) can be recalculated according to the formula: $AC_{New}=[(AC)*(E)+(TC)]/[(E)+1]$. It should be appreciated that as the average count of a count element is updated according to new execution data, the range for that count element also may shift with the average count. Further, each time the average count is updated, e.g., data is aggregated into a count element, the number of executions (E) stored within the count element can be incremented by one.

In another embodiment of the present invention, each count element can maintain a high and a low count for the computing resource being tracked as part of the execution data that is stored. The high count will be the highest count that has been aggregated into the count element that is reflected in the average count. The low count will be the lowest count aggregated into the count element and reflected in the average count. Accordingly, each time that a count is aggregated into a count element, that count can be compared with the existing high and low counts. If the count is higher than the existing high count, the count can be saved within the count element as the new high count. If the count is lower than the existing low count for the count element, the count can be used as the new low count.

Continuing with step 550, in the case where the selected count element is a newly created count element, the execution data can be stored within the selected count element. The count of the temporary buffer can be stored as the average count and the total count of the selected count element.

In step 555, the system can free or release the temporary buffer. In step 560, the CPUT can continue to execute.

FIG. 6 is a fourth flow chart illustrating a method 600 of identifying portions of a computer program that exhibit irregular performance in accordance with another embodiment of the present invention. The method 600 illustrates how the system can output the various quantities collected and/or tracked through the execution of the CPUT. As used herein, "output" or "outputting" can include, but is not limited to, storing data in memory, e.g., writing to a file, writing to a user display or other output device, e.g., playing audible notifications, sending or transmitting to another system, exporting, or the like.

Accordingly, in step 605, the system can receive a user input requesting a call graph snapshot. The user input can be received prior to the execution of the CPUT, during execution of the CPUT, or after execution of the CPUT. In step 610, the system can output the requested information. For example, the system can output execution data for the CPUT in the form of a call graph, in tabular form such as a function list, in the form of source code annotated to show resource utilization, or in any other format that may be requested by the user.

Figure 7:
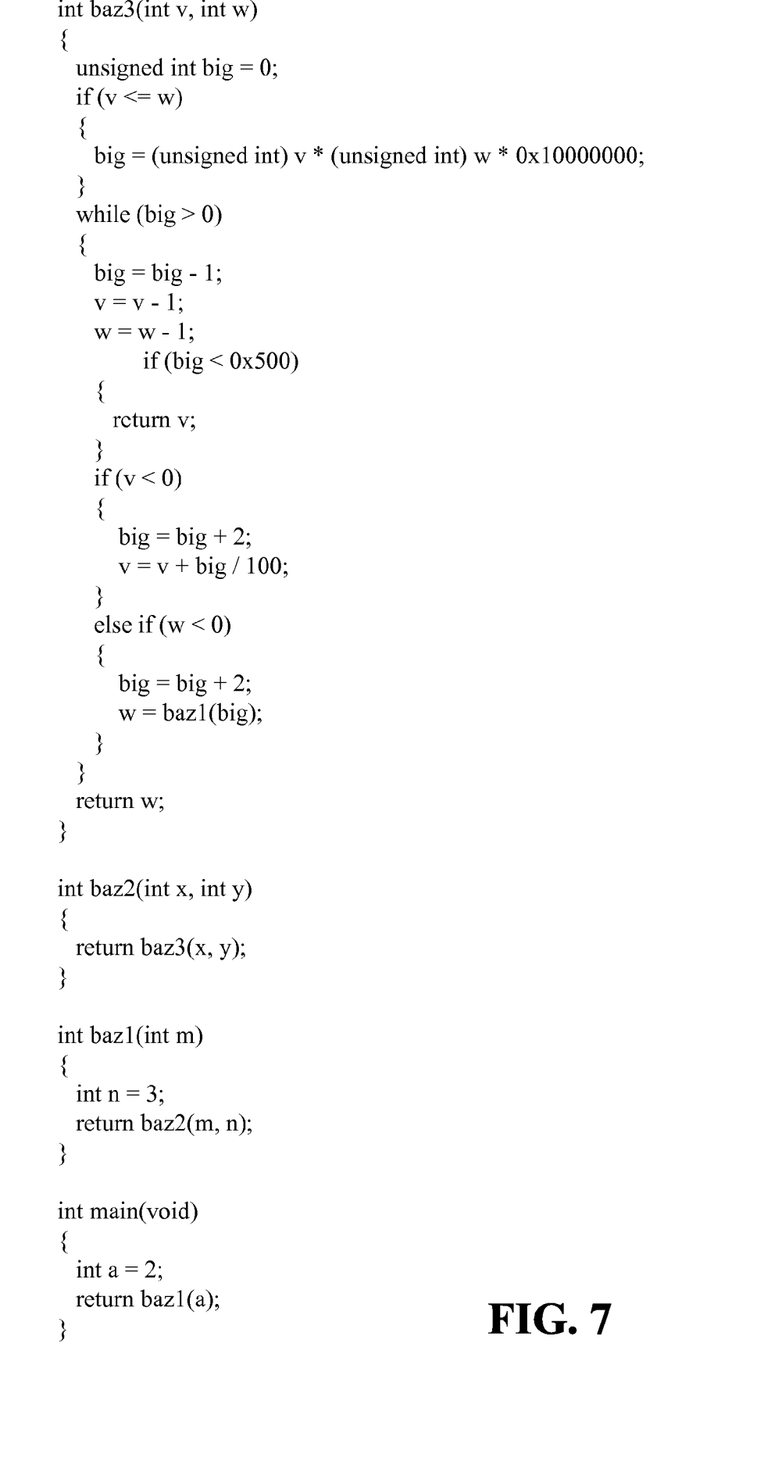
FIG. 7 is an example of source code for a CPUT that may be instrumented and executed in accordance with another embodiment of the present invention.

FIG. 7 is an example of source code for a CPUT that may be instrumented and executed in accordance with another embodiment of the present invention. The CPUT of FIG. 7 includes a function called main( ). This main( ) function calls the function baz1( ), which calls the function baz2( ), which in turn calls baz3( ). The function baz3( ) first executes for a longer period of time as compared to the other executions of the CPUT. During that first execution of baz3( ), occasionally baz3( ) calls back to baz1( ), which calls baz2( ), which calls baz3( ). In that case, however, baz3( ) executes quickly. FIG. 7 illustrates the situation in which a function such as baz3( ) may execute with a wide range of timings and thus consume varying amounts of computing resources, e.g., clock cycles.

Figure 8:
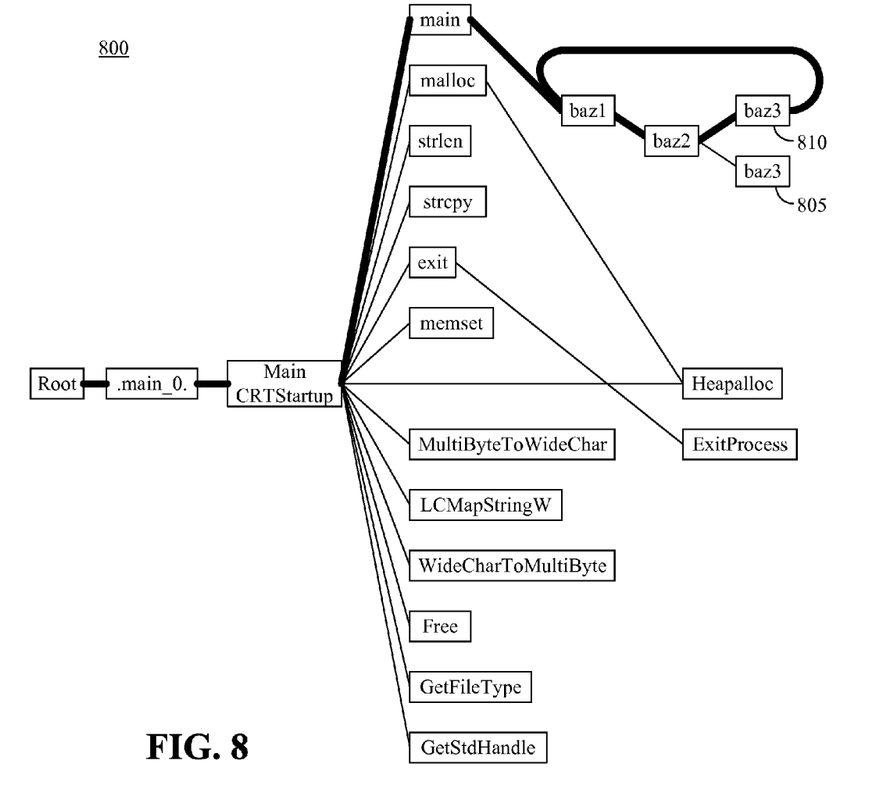
FIG. 8 is a call graph representation of the execution of the CPUT of FIG. 7 in accordance with another embodiment of the present invention.

FIG. 8 is a call graph 800 representation of the execution of the CPUT of FIG. 7. The system can generate the call graph 800 in accordance with the embodiments described herein with reference to FIGS. 1-7. The call graph 800 illustrates execution of the CPUT through various function calls, including various operating system level calls. As shown, the call graph 800 includes two nodes 805 and 810 representing different executions of the function baz3( ). As noted, in some cases the function baz3( ) executes quickly, while in other cases, the function baz3( ) requires significantly more time to complete execution.

In this example, node 805 represents one or more executions of the function baz3( ) which required a large amount of time to complete execution. Increased execution time for paths in the call graph, e.g., a particular call chain, is illustrated with arcs that are thicker than arcs within call chains that require less time for execution, or less of the selected type of computing resource. Node 810 can represent one or more executions of the function baz3( ) that required significantly less time than the executions represented by node 805. As shown, the arcs leading to node 805 are thinner than those leading to node 810. The determination of how many nodes will be used to represent a given function within a call graph can be made according to the number of count elements associated with the stack frame for the function. In this example, the function baz3( ) would be associated with a stack frame having two count elements.

Execution information for the call graph 800 can be displayed in a variety of different ways. Such information can be displayed, for example, within the nodes themselves, within pop-up style windows or balloons that can be displayed responsive to a pointer hovering over or selecting a node, or within a different window that dynamically changes the information displayed as the user selects different nodes of the call graph.

In another example, different coloring can be used to indicate different ranges of a given computing resource used for each node of the call graph 800. The thickness of the arcs used to link the various nodes of the call graph can be varied according to different quantities such as number of times the node was executed or the amount of computing resources utilized by the function (at least for that node or count element).

Any item of execution data that may be stored within a stack frame or count element of a stack frame can be displayed. Other examples of information that can be displayed can include the average count of a node, the range associated with the node, the high count, and/or the low count for the node.

By representing functions that exhibit behavior that differs from prior execution behavior as separate nodes in a call graph, a developer can determine that the performance or resource utilization of the function may be problematic. In conventional profiling solutions, the function baz3( ) would be represented by a single node. That node would include an accumulation of the data collected over each execution of the function. This means that a developer is left with an average of the execution data since the execution data collected would indicate a total amount of the computing resource used over all executions of the function. Accordingly, a conventional profiling system would be unable to detect a particular execution of a function that was resource intensive. For example, one or two executions of a function requiring ten times the amount of time of other executions of the function may not be detectable when all executions are averaged together and represented as a single node. The averaging process will dilute the influence of the abnormal executions.

Figure 9:
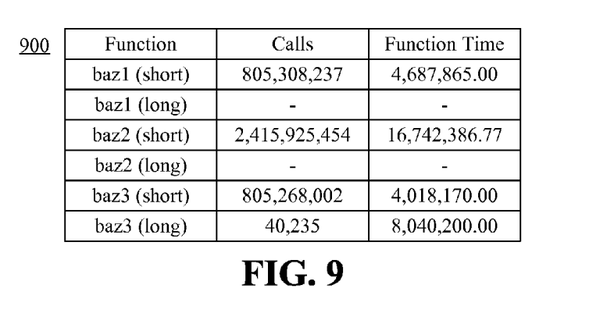
FIG. 9 is a table illustrating the presentation of execution data for a CPUT in accordance with another embodiment of the present invention.

FIG. 9 is a table 900 illustrating the presentation of execution data for a CPUT in accordance with another embodiment of the present invention. Table 900 can include one or more rows corresponding to each node in the call graph. For purposes of illustration, only a limited set of functions is shown. In the pictured example, table 900 includes two rows corresponding to each function. One row can specify execution information for the function in the case when the computing resource utilized by the function was the smallest, e.g., corresponding to the low count. The other entry can represent an execution of the function where the computing resource utilization by the function was the largest, e.g., corresponding to the high count. As shown, each function has an entry corresponding to the shortest execution time and the longest execution time.

In another embodiment, each count element can be represented as a row within a table. Accordingly, the stack frames corresponding to different functions of the CPUT can be listed, where each count element of each stack frame is displayed.

It should be appreciated that the execution data can be presented in any of a variety of different formats. In another example, the table 900 can be formatted to have one row for each different range of computing resource utilized in the same manner that the call graph may be arranged. In that case, for instance, each function could be represented by a row showing computing resource utilization in an average range, another row showing computing resource utilization in a below average range, and another row showing computing resource utilization in an above average range.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The flowcharts have been presented in a manner that illustrates the various processing tasks performed during runtime analysis of a CPUT. Those skilled in the art will appreciate that the various processing tasks can be performed, e.g., invoked, by diagnostic code inserted within the CPUT. While each of the flowcharts may illustrate a set of processing tasks that can be performed or called from within a larger function, e.g., a master function or kernel, each of the various processing steps of the flow charts may be called responsive to the insertion of diagnostic code within the CPUT that may not be organized in the form of, or called from, a master function or kernel.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of finding portions of a computer program exhibiting irregular performance, the method comprising:
   detecting an entry into a function of a computer program under test indicating a current execution of the function;
   responsive to detecting an exit from the function, determining a count of a computing resource utilized by the function during the current execution of the function;
   comparing the count of the computing resource with a count range determined according to at least one prior execution of the function;
   selecting a count element having a count range comprising the count and aggregating the count with an average count within the selected count element; and
   selectively representing the function within a call graph as a plurality of nodes according to the comparing the count of the computing resource with a count range determined according to at least one prior execution of the function.

2. The computer-implemented method of claim 1, wherein the comparing comprises:
   identifying a stack frame associated with the function; and
   comparing the count with the count range of at least one count element in the stack frame.

3. The computer-implemented method of claim 2, further comprising defining the count range of each count element according to the average count within each respective count element.

4. The computer-implemented method of claim 2, further comprising: determining that the count is not within the count range of any count element; creating a new count element; and storing the count as part of the new count element.

5. The computer-implemented method of claim 1, wherein the selectively representing comprises:
   identifying a stack frame corresponding to the function;
   determining a number of count elements associated with the stack frame, wherein each count element represents at least one execution of the function that utilized an amount of the computing resource within a range corresponding to the count element; and
   displaying the call graph using a number of nodes to represent the function that depends upon the number of count elements associated with the stack frame corresponding to the function.

6. The computer-implemented method of claim 1, further comprising selecting the computing resource to be time needed to complete a single execution of the function.

7. The computer-implemented method of claim 1, further comprising selecting the computing resource to be amount of allocated memory successfully requested by the function during a single execution.

8. A computer-implemented method of finding portions of a computer program exhibiting irregular performance, the method comprising:
   determining a count indicating usage of a computing resource during invocation of a function;
   identifying a stack frame corresponding to the function, wherein the stack frame comprises at least one count element, wherein each count element represents at least one execution of the function that utilized an amount of the computing resource within a range corresponding to the count element;
   comparing the count with the count range of each count element;
   selecting a count element having a count range comprising the count;
   when the count is within the count range of the selected count element, aggregating the count within the selected count element;
   when the count does not fall within any count range of the at least one count element, creating a new count element and adding the count to the new count element; and
   outputting a call graph representing an execution of the computer program and including within the call graph a number of nodes, each representing the function, wherein the number of nodes depends upon a number of the count elements associated with the stack flame corresponding to the function.

9. The computer-implemented method of claim 8, further comprising defining the count range of each count element to depend upon an average count within each respective count element.

10. The computer-implemented method of claim 9, further comprising calculating the average count within each count element according to a plurality of counts from prior executions of the function.

11. The computer-implemented method of claim 8, further comprising selecting the computing resource to be time needed to complete a single execution of the function.

12. The computer-implemented method of claim 8, further comprising selecting the computing resource to be amount of allocated memory successfully requested by the function during a single execution.

13. A computer program product comprising a computer-usable storage medium having stored therein computer-usable program code that finds portions of a computer program exhibiting irregular performance, the computer-usable program code, which when executed on a computer hardware system causes the computer hardware system to perform:
   detecting an entry into a function of a computer program under test indicating a current execution of the function;
   responsive to detecting an exit from the function, determining a count of a computing resource utilized by the function during the current execution of the function;
   comparing the count of the computing resource with a count range determined according to at least one prior execution of the function;
   selecting a count element having a count range comprising the count and aggregating the count with an average count within the selected count element; and
   selectively representing the function within a call graph as a plurality of nodes according to the comparing.

14. The computer program product of claim 13, wherein the comparing comprises:
   identifying a stack frame associated with the function; and
   comparing the count with the count range of at least one count element associated with the stack frame.

15. The computer program product of claim 14, wherein the computer-usable program code further causes the computer hardware system to perform defining the count range of each count element according to the average count within each respective count element.

16. The computer program product of claim 14, wherein the computer-usable program code further causes the computer hardware system to perform:
   determines determining that the count is not within the count range of any count element;
   creating a new count element; and
   storing the count as part of the new count element.

17. The computer program product of claim 13, wherein the selectively representing comprises:
   identifying a stack frame corresponding to the function;
   determining a number of count elements associated with the stack frame, wherein each count element represents at least one execution of the function that utilized an amount of the computing resource within a range corresponding to the count element; and
   displaying the call graph using a number of nodes to represent the function that depends upon the number of count elements associated with the stack frame corresponding to the function.

18. The computer program product of claim 13, wherein the computer-usable program code further causes the computer hardware system to perform:
   selecting the computing resource to be time needed to complete a single execution of the function or
   computer-usable program code that selects the computing resource to be amount of allocated memory successfully requested by the function during a single execution.

* * * * *